United States Patent
Fukuizumi et al.

(10) Patent No.: US 7,144,552 B1
(45) Date of Patent: Dec. 5, 2006

(54) METHOD AND APPARATUS FOR PREPARING CHEMICAL SOLUTIONS

(75) Inventors: Masataka Fukuizumi, Kasugai (JP); Toru Matoba, Kasugai (JP); Hiroshi Osuda, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/619,768

(22) Filed: Jul. 19, 2000

(30) Foreign Application Priority Data

Dec. 24, 1999 (JP) ................. 11-366734

(51) Int. Cl.
G01N 21/00 (2006.01)
B01L 3/02 (2006.01)
B01L 11/00 (2006.01)
G05D 23/00 (2006.01)
G05B 21/00 (2006.01)

(52) U.S. Cl. .................. 422/62; 422/67; 422/100; 422/103; 422/110; 137/93; 366/131; 366/132; 700/266; 700/271; 700/282; 700/285; 261/124

(58) Field of Classification Search ................ 261/124, 261/122.1; 210/221.2; 422/110, 100, 103, 422/62, 67; 700/266, 271, 272, 282, 285; 366/131, 132, 152.4; 137/93
See application file for complete search history.

(56) References Cited

U.S. PATENT DOCUMENTS

| 3,773,300 | A | * | 11/1973 | Hauser | ................. 366/136 |
| 4,070,279 | A | * | 1/1978 | Armstrong | |
| 4,096,028 | A | * | 6/1978 | Rosenberger | ................. 162/49 |
| 4,448,539 | A | * | 5/1984 | Burgert | ................. 366/132 |
| 4,779,762 | A | * | 10/1988 | Klein et al. | ................. 222/52 |
| 5,376,311 | A | * | 12/1994 | DeGuzman | |
| 5,537,914 | A | * | 7/1996 | Gibney et al. | ............. 99/323.2 |
| 5,674,410 | A | | 10/1997 | Nakajima et al. | |
| 5,954,089 | A | * | 9/1999 | Seymour | ................. 137/487.5 |
| 5,971,368 | A | * | 10/1999 | Nelson et al. | |
| 6,086,057 | A | * | 7/2000 | Mitsumori et al. | |
| 6,135,433 | A | * | 10/2000 | Nurmi | |
| 6,142,458 | A | * | 11/2000 | Howk | |
| 6,209,855 | B1 | * | 4/2001 | Glassford | |
| 6,293,525 | B1 | * | 9/2001 | Ginsburgh et al. | |
| 6,315,942 | B1 | * | 11/2001 | Spears et al. | |
| 6,319,477 | B1 | * | 11/2001 | Du Toit | |
| 6,743,397 | B1 | * | 6/2004 | Zesiger | ................. 422/67 |
| 2001/0006261 | A1 | * | 7/2001 | Kelly | |
| 2001/0042929 | A1 | * | 11/2001 | Rexford et al. | |
| 2002/0034122 | A1 | * | 3/2002 | Lemke | ................. 366/136 |
| 2004/0057334 | A1 | * | 3/2004 | Wilmer et al. | ............... 366/136 |
| 2004/0143370 | A1 | * | 7/2004 | Lu et al. | ................. 700/282 |

FOREIGN PATENT DOCUMENTS

JP  05-2730  1/1993
JP  6-37080  2/1994

(Continued)

Primary Examiner—Brian R. Gordon
(74) Attorney, Agent, or Firm—Armstrong, Kratz, Quintos, Hanson & Brooks, LLP

(57) ABSTRACT

A chemical solution preparation apparatus for preparing a chemical solution from chemical gas of an industrial chemical grade. A dissolution unit dissolves the chemical gas in pure water, which is contained in a tank. A gas discharge control unit controls the amount of chemical gas discharged from the dissolution unit. A liquid discharge discharges a predetermined amount of the chemical solution from the tank. At least one of the gas discharge control unit and the liquid discharge control unit are operated at substantially the same time as the dissolution unit.

27 Claims, 7 Drawing Sheets

FOREIGN PATENT DOCUMENTS

| | | |
|---|---|---|
| JP | 06-292822 | 10/1994 |
| JP | 10-290918 | 11/1998 |
| JP | 11-300365 | 11/1999 |

\* cited by examiner

METHOD AND APPARATUS FOR PREPARING CHEMICAL SOLUTIONS

BACKGROUND OF THE INVENTION

The present invention relates to a method and apparatus for preparing chemical solutions, and more particularly, to a method and apparatus for preparing chemical solutions having high purity grades and used to fabricate electronic devices, such as semiconductor devices, from chemical gases having industrial chemical grades.

During the fabrication of electronic devices, such as semiconductor devices and LCDs, a wide variety of chemical solutions having different concentrations and different compositions are used in abundance as required in each fabrication process. Such chemical solutions are purchased from chemical makers.

Each type of chemical solution is stored in a reservoir tank, which is located in a fabrication plant, and replenished by tanker trucks in a liquid form. When replenishing the reservoir tank, an impurity may get mixed with and contaminate the chemical solution. Further, the storage of the chemical solution over a long period may change the concentration or composition of the chemical solution. A reduction in quality, or a lower purity, of such chemical solution may degrade the quality of the fabricated electronic devices.

Therefore, if the concentration of the chemical solution changes, the concentration is adjusted before usage, and if the chemical solution is contaminated by an impurity, the chemical solution is purified before usage. Such adjustment and purification takes time. Further, the purchase of chemical solutions increases the fabrication cost of the electronic devices.

Additionally, waste material, which includes chemical gases and liquids, must be reduced in semiconductor fabrication plants to protect the environment and comply with the ISO 14000 series of standards.

SUMMARY OF THE INVENTION

It is an object of the present invention to provide a method and apparatus for preparing a chemical solution having a relatively high purity from a chemical gas having an industrial chemical grade.

To achieve the above object, the present invention provides a method for preparing a chemical solution. The method includes the step of dissolving a chemical gas in a liquid to prepare the chemical solution. The liquid is pure water or a mixture having a predetermined composition. The method further includes the step of discharging at least either one of an adjusted amount of the chemical gas that was not dissolved in the liquid and a predetermined amount of the chemical solution. The dissolving step and the discharging step are performed at substantially the same time.

A further aspect of the present invention provides a chemical solution preparation apparatus including a preparation tank for storing a liquid, which is one of pure water or a mixture having a predetermined composition, a dissolution unit for dissolving a chemical gas in the liquid, and at least either one of a gas discharge control unit for discharging an adjusted amount of the chemical gas that was not dissolved in the liquid by the dissolution unit and a liquid discharge control unit for discharging a predetermined amount of the chemical solution from the preparation tank. The gas discharge control unit and the liquid discharge control unit are operated at substantially the same time as the dissolution unit.

Another aspect of the present invention provides a chemical solution preparation apparatus including a dissolution unit for dissolving a chemical gas in a liquid to prepare a chemical solution and cooling the chemical solution during the preparation, and a gas discharge control unit for discharging an adjusted amount of the chemical gas that was not dissolved in the liquid by the dissolution unit.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment according to the present invention will now be discussed.

Figure 1:
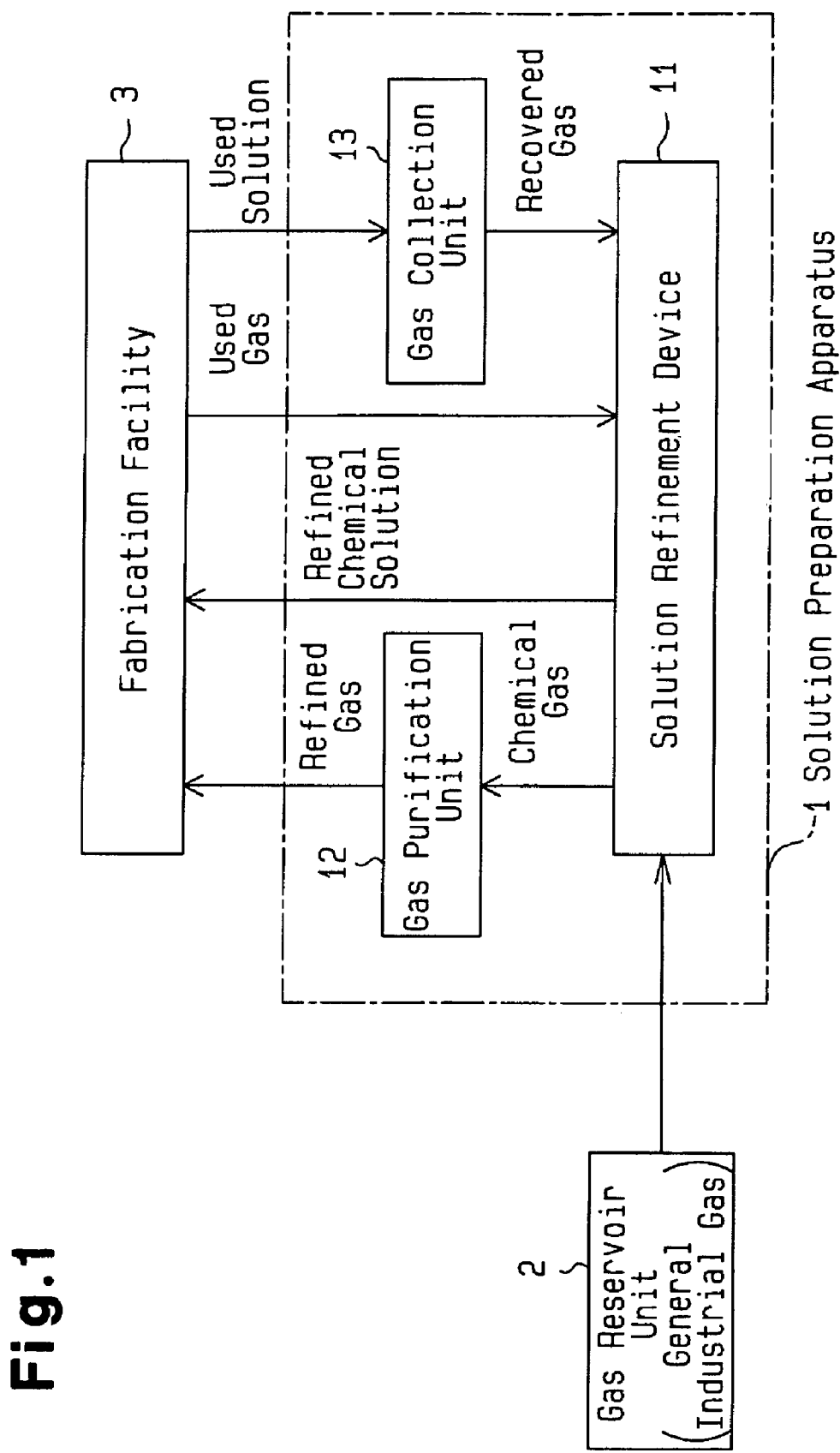
FIG. 1 is a schematic block diagram illustrating a fabrication plant, which has a closed gas system, according to an embodiment of the present invention.

FIG. 1 shows a fabrication plant, which has a closed gas system, according to one embodiment of the present invention. The fabrication plant includes a chemical solution preparation apparatus 1, a gas reservoir unit 2 for storing a general industrial chemical gas, and a fabrication facility 3. The solution preparation apparatus 1 supplies refined chemical gas, which is prepared by purifying the general chemical gas, to the fabrication facility 3. The refined chemical gas is used at the fabrication facility 3 to fabricate, for example, electronic devices. The solution preparation apparatus 1 collects the chemical gas and chemical solution that has been used at the fabrication facility 3 to prepare a chemical solution (chemical liquid). The solution preparation apparatus 1 includes a chemical solution refinement device 11, a gas purification unit 12, and a gas collection unit 13.

The solution refinement device 11 simultaneously dissolves and refines the industrial chemical gas to prepare and supply to the fabrication facility 3 a refined chemical solution (liquid chemical) having a relatively high purity that is optimal for usage at the fabrication facility 3. General industrial chemical gases cost one tenth or less as much as chemical gases produced exclusively for semiconductors.

Thus, the solution refinement device 11 reduces the cost for preparing chemical solutions by refining industrial chemical gases. The solution refinement device 11 prepares chemical solutions on demand from the fabrication facility 3. Thus, the prepared chemical solution need not be stored over a long period of time. This substantially prevents the mixture of impurities and change in composition. Thus, the chemical solution supplied to the fabrication facility 3 is stable. Further, since the dissolution and refinement are performed simultaneously, the time for preparing the chemical solution is shortened.

The industrial chemical gas is sent from the solution refinement device 11 to the gas purification unit 12 when needed by the fabrication facility 3. The gas purification unit 12 purifies the industrial chemical gas to prepare refined chemical gas and supplies the refined chemical gas to the fabrication facility 3.

The gas collection unit 13 collects chemical gas components from the chemical solution that has been used at the fabrication facility 3 and supplies the collected chemical gas to the solution refinement device 11. The solution refinement device 11 prepares a refined chemical solution (e.g., liquid) from the used chemical gas and the collected chemical gas and supplies the refined chemical solution to the fabrication facility 3. This decreases the consumption of fresh industrial gas and decreases the cost of the chemical solution.

Figure 2:
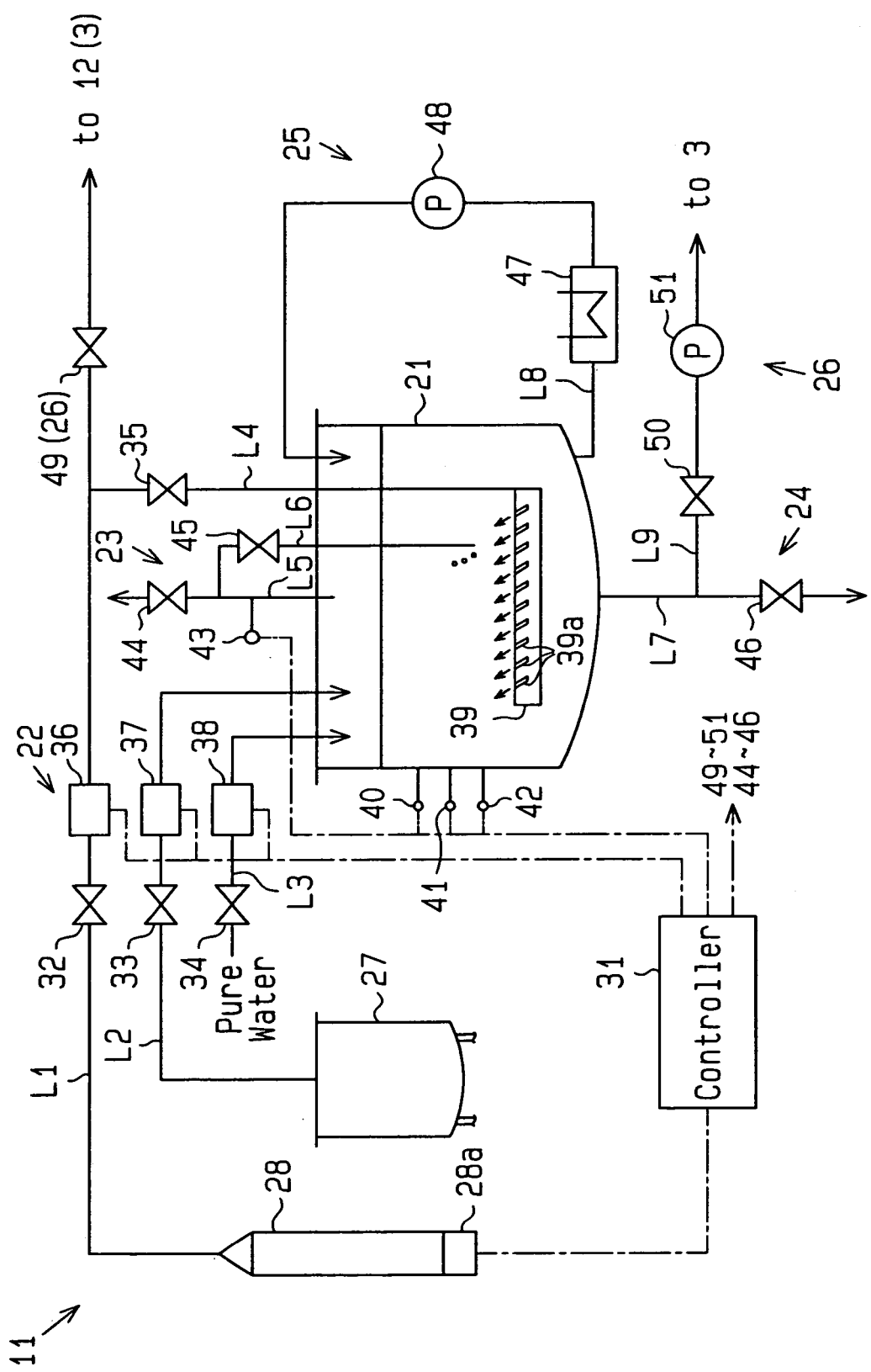
FIG. 2 is a schematic diagram showing a solution refinement apparatus of the first embodiment of the present invention.

The solution refinement device 11 will now be described with reference to FIG. 2.

The solution refinement device 11 includes a preparation tank 21, a dissolution unit 22, a gas discharge control unit 23, a liquid discharge control unit 24, a cooling unit 25, and a supply unit 26.

The dissolution unit 22 prepares a chemical solution having the composition required by the fabrication facility 3 of FIG. 1. A chemical gas is supplied to the dissolution unit 22 from a gas cylinder 28. The dissolution unit 22 dissolves the chemical gas in pure water or a solvent, such as a mixture of pure water and a chemical liquid (e.g., 50 percentage by weight of hydrofluoric acid) provided from a material tank 27, to prepare a chemical solution having a predetermined concentration.

The material tank 27 is used in accordance with the type of chemical solution that is prepared. For example, the material tank 27 is required when preparing a mixture of ammonium fluoride and hydrofluoric acid. On the other hand, the material tank 27 is not required when preparing ammonia water. A plurality of the gas cylinders 28, each containing a different type of chemical gas, may be employed. In this case, the gas cylinders 28 that are to be employed are selected as required.

Undissolved chemical gases including impurities reside in the preparation tank 21. The gas discharge control unit 23 discharges the undissolved chemical gases from the preparation tank 21. This eliminates impurities and enables preparation of a chemical solution having a high purity.

The liquid discharge control unit 24 discharges a predetermined amount of the chemical solution from the preparation tank 21. The discharged chemical solution includes impurities that cannot be disposed of by the gas discharge control unit 23 (e.g., non-volatile components such as metal). By discharging impurities with the liquid at the bottom of the tank 21, a chemical solution having high purity is produced.

The gas discharge control unit 23 (and/or the liquid discharge control unit 24) dissolves chemical gases in the liquid contained in the preparation tank 21 and simultaneously performs a predetermined treatment. That is, the solution refinement device 11 dissolves chemical gases and simultaneously refines the chemical solution. Thus, a very pure chemical solution is quickly prepared.

The cooling unit 25 cools the liquid contained in the preparation tank 21 to a temperature that is optimal for dissolving chemical gases, such as 20° C. or lower. The heat generated when dissolving chemical gases (heat of dissolution or heat of neutralization) increases the temperature of the liquid in the tank 21. Generally, more gas is dissolved in the solvent at lower temperatures. Thus, an increase in the temperature of the solvent is prevented to improve dissolution of the chemical gases. This increases the dissolution efficiency of the chemical gases.

In response to a demand from the fabrication facility 3 of FIG. 1, the supply unit 26 supplies the industrial chemical gas and the prepared chemical solution to the fabrication facility 3.

The structure of each of the units 22 to 26 will now be discussed.

The dissolution unit 22 includes a controller 31, a gas control valve 32, a material control valve 33, a water control valve 34, a bubbler control valve 35, a gas mass flow controller 36, a material mass flow controller 37, a water mass flow controller 38, a bubbler element 39, a thermometer 40, an ultrasonic wave velocity meter 41, and a specific conductance meter 42.

The gas flow control valve 32 and the gas mass flow controller 36 are arranged in a pipe L1, through which the chemical gas is supplied from the gas cylinder 28. The controller 31 controls the gas control valve 32 and the gas mass flow controller 36 to permit and inhibit the flow of the chemical gas and thus to adjust the flow rate of the chemical gas.

The material control valve 33 and the material mass flow controller 37 are arranged in a pipe L2, through which the chemical solution is supplied from the material tank 27 to the preparation tank 21. The controller 31 controls the material control valve 33 and the material mass flow controller 37 to control the supply of the chemical solution to the preparation tank 21.

The water control valve 34 and the water mass flow controller 38 are arranged in a pipe L3, through which pure water is supplied to the preparation tank 21.

The bubbler control valve 35 is arranged in a pipe L4, through which the chemical gas flows into the preparation tank 21 from the pipe L1. The controller 31 controls the bubbler control valve 35 and thus controls the supply of the chemical gas to the preparation tank 21.

The bubbler element 39, which is connected to the pipe L4 and arranged at the bottom of the preparation tank 21, has a plurality of nozzles 39a. The chemical gas supplied from the pipe L4 is ejected from the plurality of nozzles 39a forming fine bubbles.

Figure 3A:
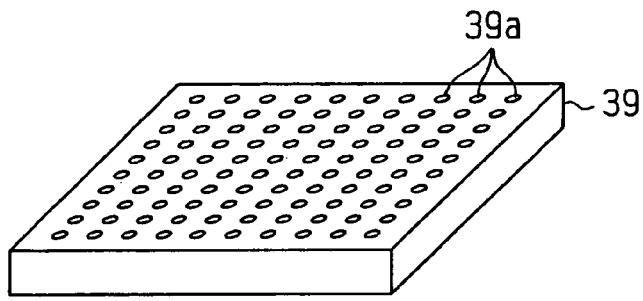
FIGS. 3A, 3B, and 3C are schematic diagrams each showing a bubbler element.
Figure 3B:
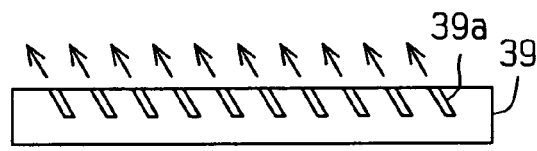
Figure 3C:
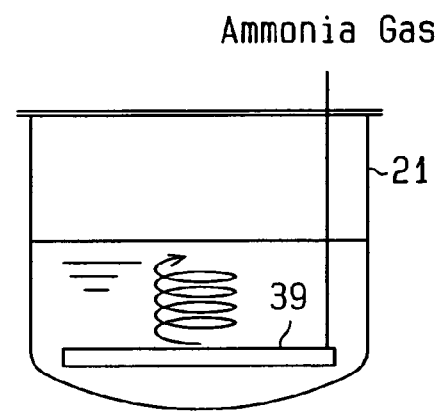

As shown in FIGS. 3A to 3C, the bubbler element 39 has a generally square plate-like shape with the nozzles 39a formed in the upper surface of the bubbler element 39. The bubbler element 39 forms fine bubbles of the chemical gas to facilitate dissolution of the chemical gas into the pure water. In other words, the nozzles 39a improve the efficiency of dissolving the chemical gas.

The nozzles 39a are each formed so that the chemical gas bubbles are ejected in a direction inclined by a predetermined angle (e.g., 30 degrees) from the vertical direction. The diagonally discharged bubbles form a swirl in the preparation tank 21 and agitate the liquid in the tank 21. This further improves the dissolution efficiency of the chemical gas.

The thermometer 40, the ultrasonic wave velocity meter 41, and the specific conductance meter 42 are used to measure the concentration of the solution prepared in the preparation tank 21 and are connected to the controller 31. The controller 31 calculates the concentration of the chemical solution from the signals provided by the thermometer 40, the ultrasonic wave velocity meter 41, and the specific conductance meter 42. In accordance with the calculated concentration, the controller 31 controls the supplied amounts of the chemical gas, the chemical solution, and the pure water by manipulating the valves 32–34 and the mass flow controllers 36–38 so that the chemical solution in the preparation tank 21 has the desired concentration.

The concentration of the chemical solution in the preparation tank 21 may also be estimated from the temperature change of the liquid detected by the thermometer 40. For example, the controller 31 may be connected to a load cell 28a of the gas cylinder 28 to meter the amount of residual chemical gas in the gas cylinder 28. The amount of the used chemical gas used as raw material is then calculated based on the residual amount. This enables the controller 31 to obtain the concentration of the chemical solution being prepared in the preparation tank 21.

The gas discharge control unit 23 includes the controller 31, a concentration meter 43, an output control valve 44, and an input control valve 45. The output control valve 44 is arranged in a pipe L5, through which the undissolved chemical gas from the preparation tank 21 is discharged. The concentration meter 43 measures the chemical gas concentration of the discharged gas in the pipe L5. The input control valve 45 is arranged in a pipe L6 extending from the pipe L5 between the concentration meter 43 and the output control valve 44. The end of the pipe L6 is submerged in the chemical solution of the preparation tank 21.

The controller 31 controls the control valves 44, 45 in accordance with the chemical gas concentration of the discharged gas measured by the concentration meter 43. More specifically, the controller 31 opens the output control valve 44 and closes the input control valve 45 if the chemical gas concentration is lower than the predetermined value. This discharges chemical gas including impurities through the pipe L5. If the chemical gas concentration is equal to or greater than a predetermined value, the output control valve 44 is either closed or it opening is narrowed and the input control valve 45 is opened. This forms bubbles in the liquid and dissolves the high concentration chemical gas. Accordingly, chemical gas having a high concentration is recycled.

The liquid discharge control unit 24 includes the controller 31 and a discharge valve 46. The discharge valve 46 is arranged in a liquid discharge pipe L7, which is connected to the bottom of the preparation tank 21. The controller 31 controls the discharge valve 46 during dissolution of the chemical gas and discharges a constant amount of chemical solution, which includes impurities.

The cooling unit 25 includes the controller 31, a cooling element 47, and a cooling pump 48. The cooling element 47 and the cooling pump 48 are arranged in a cooling pipe L8. One end of the cooling pipe L8 is connected to the bottom of the preparation tank 21, while the other end drains into the upper portion of the tank 21 as shown in FIG. 2.

The controller 31 drives the pump 48 to circulate the liquid in the tank 21 through the pipe L8 and cool the circulating liquid with the cooling element 47 so that the temperature of the liquid in the tank 21 is cooled to a temperature optimal for dissolving the chemical gas (e.g., 20° C.)

The supply unit 26 includes the controller 31, gas and solution supply control valves 49, 50, and a solution supply pump 51. The solution supply control valve 50 and the solution supply pump 51 are arranged in a pipe L9 connected to the bottom of the preparation tank 21. The controller 31 controls the gas supply control valve 49 to supply chemical gas from the gas cylinder 28 to the fabrication facility 3 via the gas purification unit 12, which is shown in FIG. 1. Further, the controller 31 opens the solution supply control valve 50 and drives the solution supply pump 51 to supply the chemical solution from the preparation tank 21 to the fabrication facility 3.

A case in which ammonia water is prepared by the solution refinement device 11 and provided to the fabrication facility 3 will now be discussed. Liquefied ammonia gas is contained in the gas cylinder 28.

The controller 31 first controls the water control valve 34 and the water mass flow controller 38 to supply a predetermined amount of pure water to the preparation tank 21. The controller 31 then controls the gas control valve 32, the bubbler control valve 35, and the gas mass flow controller 36 to supply a predetermined amount of ammonia gas to the preparation tank 21. This forms ammonia gas bubbles in the pure water thereby dissolving the ammonia gas and preparing ammonia water.

The dissolution of the ammonia gas in the pure water generates heat of hydration and increases the temperature of the chemical solution in the tank 21. Accordingly, the controller 31 drives the cooling pump 48 to cool the solution with the cooling element 47.

To adjust the concentration of the ammonia water to a predetermined concentration, for example, to a concentration within the range between zero and 29 wt % that is for the fabrication of semiconductors, the controller 31 measures the temperature, the ultrasonic wave velocity, and the specific conductance with the associated thermometer 40, the ultrasonic wave velocity meter 41, and the specific conductance meter 42. The concentration of the ammonia water is then computed from the measured result.

The controller 31 controls the gas, water, and bubbler control valves 32, 34, 35 and the gas and water mass flow controllers 36, 38 to supply the ammonia gas and pure water to the preparation tank 21 and adjust the concentration of the ammonia water. When the concentration of the ammonia water reaches the target value, the controller 31 closes the bubbler control valve 35 and stops supplying ammonia gas.

Afterward, in response to the demand from the fabrication facility 3 of FIG. 1, the controller 31 controls the solution supply control valve 50 and the solution supply pump 51 to supply the ammonia water prepared in the preparation tank 21 to the fabrication facility 3.

A case in which a mixture of ammonium fluoride and hydrofluoric acid is prepared by the solution refinement device 11 will now be discussed. The material tank 27 contains 50 wt % of hydrofluoric acid.

The controller 31 first controls the material and water control valves 33, 34 and the material and water mass flow controllers 37, 38 to supply a predetermined amount of hydrofluoric acid and pure water to the preparation tank 21. The controller 31 then controls the gas and bubbler control valves 32, 35 and the gas mass flow controller 36 to supply ammonia gas to the preparation tank 21.

The dissolution of the ammonia gas in the mixture of ammonium fluoride and hydrofluoric acid generates heat of neutralization and increases the temperature of the solution in the preparation tank 21. Accordingly, the controller 31 drives the cooling pump 48 to cool the solution with the cooling element 47.

For example, to adjust the concentration of ammonium fluoride within a range of 0 to 40 wt % and hydrofluoric acid within a range of 0 to 5 wt %, the controller 31 measures the parameters associated with the thermometer 40, the ultrasonic wave velocity meter 41, and the specific conductance meter 42 to calculate the concentration of the mixture of ammonium fluoride and hydrofluoric acid.

Based on the calculated result, the controller 31 controls the gas, material, water, and bubbler control valves 32–35 and the gas, material, and water mass flow controllers 36–38 to adjust the concentration of the ammonium fluoride and hydrofluoric acid mixture. When the target concentration is reached, the controller 31 closes the bubbler control valve 35 and completes the supply of ammonia gas.

Subsequently, the controller 31 controls the solution supply control valve 50 and the solution supply pump 51 in response to the demands of the fabrication facility 3 and supplies the mixture of ammonium fluoride and hydrofluoric acid, which has the predetermined concentration, from the preparation tank 21 to the fabrication facility 3.

Figure 4:
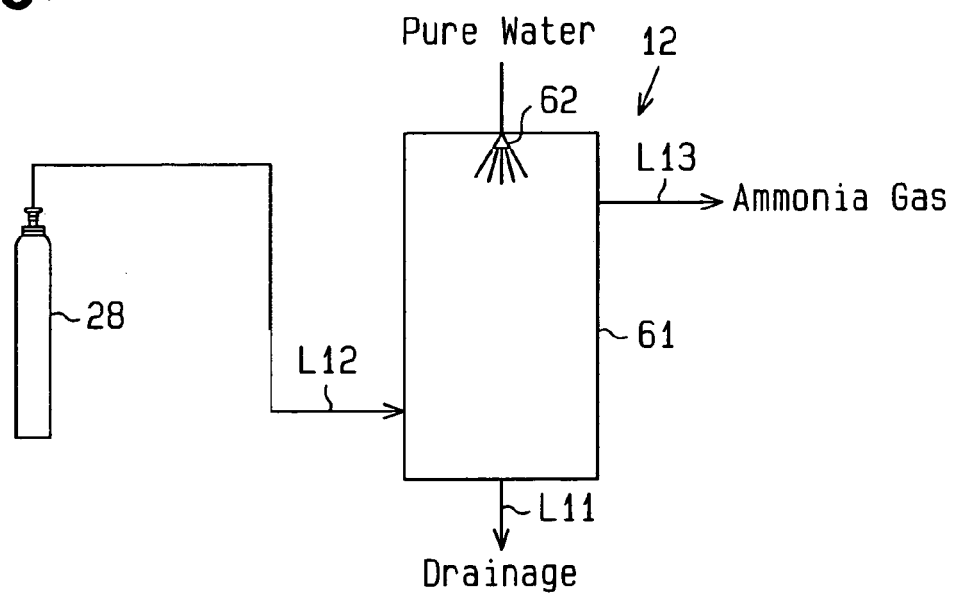
FIG. 4 is a schematic diagram showing a gas purification unit.

The gas purification unit 12 will now be discussed with reference to FIG. 4.

The gas purification unit 12 includes a gas purification tank 61 and a spray head 62 arranged on an upper wall of the tank 61. Pure water is sprayed into the tank 61 from the spray head 62. A drain pipe L11 for draining water, which includes impurities, is connected to the bottom of the tank 61. Further, the industrial chemical gas of the gas cylinder 28 is supplied into a lower portion of the tank 61 through a pipe L12. Refined gas is supplied to the fabrication facility 3 through a pipe L13 connected to the upper portion of the tank 61.

The pure water is sprayed into the industrial chemical gas in the tank 61 to eliminate impurities such as metal and fine particles suspended in the chemical gas. The water and impurities are then drained into the drain pipe L11.

The gas purification unit 12 purifies relatively low purity chemical gas, which is used for general industrial purposes, and refines the chemical gas to a high purity so that the gas can be used to fabricate electronic devices. The high purity chemical gas flows through the pipe L13 to the fabrication facility 3.

Figure 5:
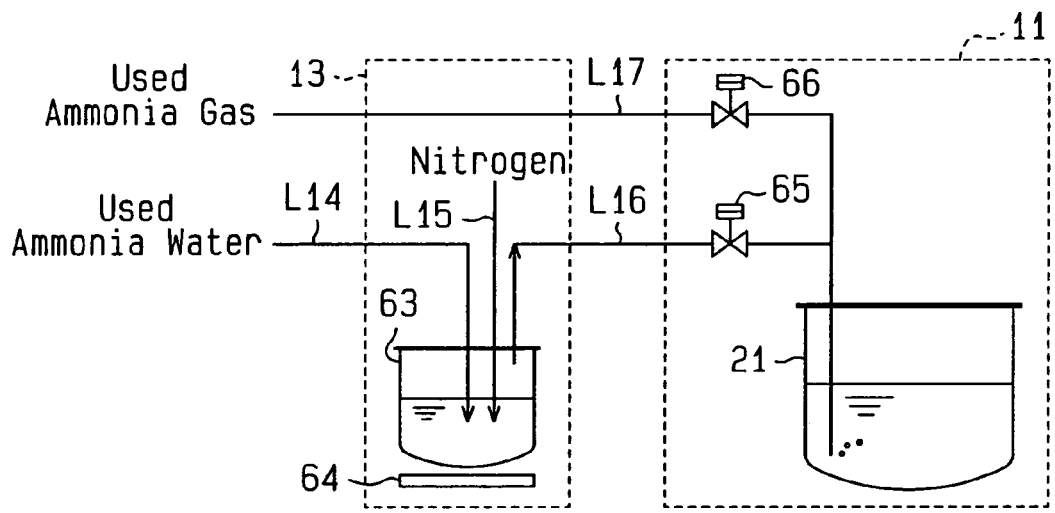
FIG. 5 is a schematic diagram showing a gas collection unit.

The gas collection unit 13 will now be discussed with reference to FIG. 5.

The gas collection unit 13 includes a gas extraction tank 63 and a heater 64. Used ammonia water is supplied to the tank 63 from the fabrication facility 3 through a pipe L14. Bubbles of nitrogen gas, or inert gas, produced when heated by a heater 64 and/or supplied through a pipe L15 are formed in the used ammonia. This decomposes the used ammonia water into ammonia gas and liquid (water including impurities) and enables collection of the ammonia gas. The collected ammonia gas is supplied to the preparation tank 21 of the solution refinement device 11 through a pipe L16.

The used ammonia gas is supplied to the preparation tank 21 from the fabrication facility through a pipe L17. First and second control valves 65, 66 are arranged in the pipes L16, L17, respectively. The control valves 65, 66 are opened and closed as required to form bubbles of the used ammonia gas or the collected ammonia gas in the liquid contained in the preparation tank 21 (pure water, hydrofluoric acid, etc.).

In this manner, the used chemical gas and the chemical gas collected from the used chemical solution are recycled. This decreases the amount of fresh chemical gas that is used and decreases the cost of raw materials.

The first embodiment has the advantages described below.

(1) The dissolution of an industrial chemical gas in the preparation tank 21, the control of the discharged gas and/or the discharge of the predetermined amount of the chemical solution from the dissolution unit 22 are performed simultaneously. That is, dissolution of the industrial chemical gas and refinement of the chemical solution are performed simultaneously. Thus, the chemical solution is prepared with a stable quality within a short period of time and supplied to the fabrication facility. Further, the cost of purchasing fresh chemical solution is decreased significantly.

(2) When dissolving the chemical gas, the cooling unit cools the chemical solution to a temperature optimal for dissolving chemical gases. This improves the chemical gas dissolving efficiency.

(3) The nozzles 39a formed in the bubbler element 39 improve the dissolving efficiency of the chemical gas.

(4) The concentration of the chemical solution being prepared is calculated from the parameters measured by the thermometer 40, the ultrasonic wave velocity meter 41, and the specific conductance meter 42. Thus, the concentration of a single component chemical solution in which a chemical gas is dissolved in pure water and the concentration of a two component chemical solution in which the chemical gas is dissolved in a mixture having a predetermined composition are accurately measured.

(5) The gas discharge control unit 23 forms bubbles of the undissolved chemical gas in the preparation tank 21.

This efficiently dissolves the chemical gas. Further, this decreases the amount of wasted chemical gas.

(6) The used chemical gas discharged from the electronic device fabrication facility 3 is dissolved in a liquid. This forms a chemical closed gas system and decreases the cost for purchasing fresh chemical gas.

(7) The gas collection unit 13 collects chemical gases from the used chemical solution discharged by the electronic device fabrication facility 3 and dissolves the collected chemical gas in a liquid. This forms a chemical closed gas system and decreases the cost for purchasing fresh chemical gas.

Figure 12:
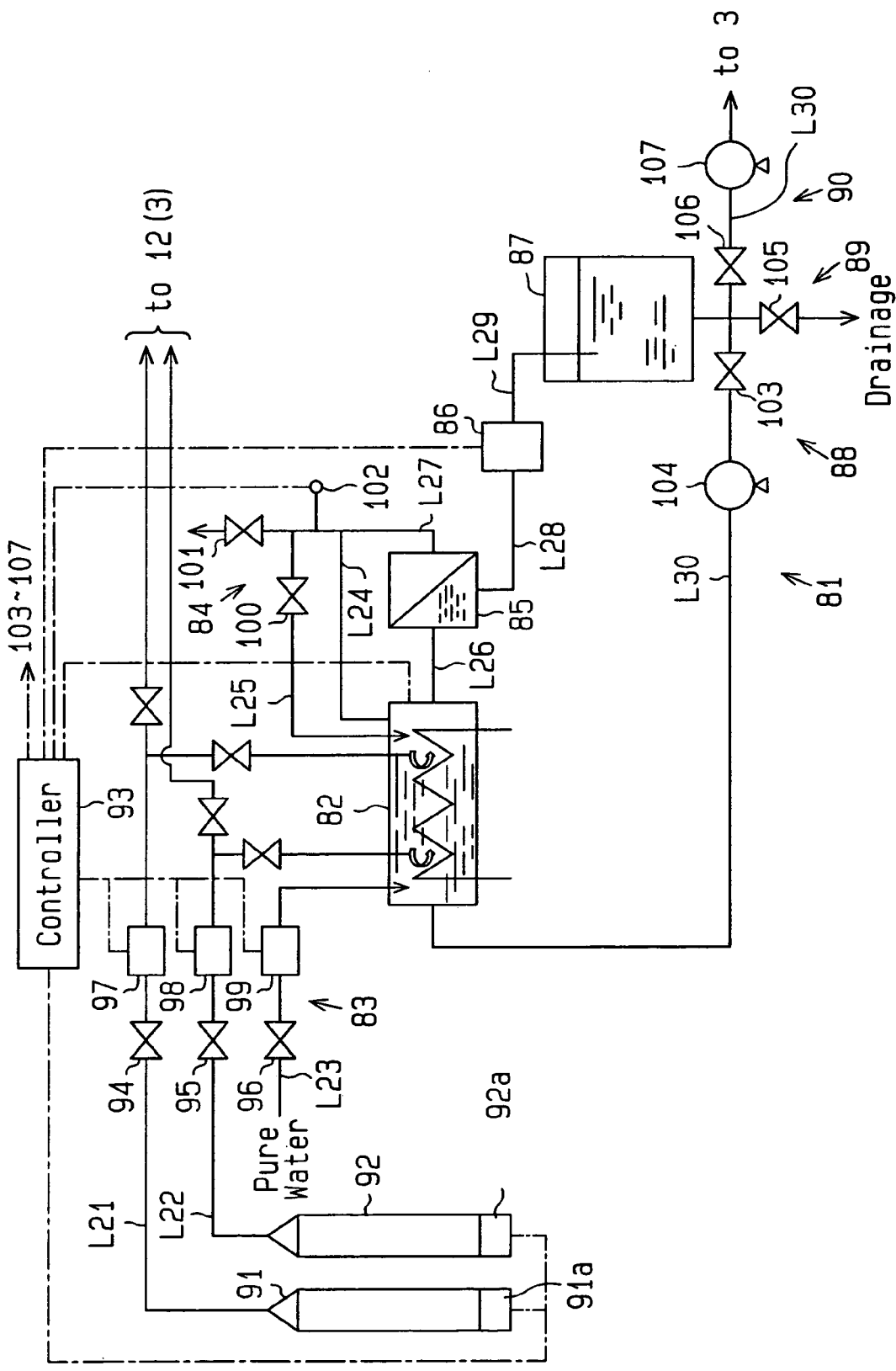
FIG. 12 is a schematic block diagram illustrating a solution refinement device according to a second embodiment of the present invention.

A second embodiment according to the present invention will now be described with reference to FIG. 12. Like or same reference numerals are given to those components that are the same as the corresponding components of the first embodiment. In the second embodiment, a chemical solution refinement device 81, which is shown in FIG. 12, is used in lieu of the refinement device 11 of the first embodiment.

The chemical solution refinement device 81 includes a cooling device 82, a dissolution unit 83, a gas discharge control unit 84, a debubbling device 85, a concentration measuring device 86, a mixing tank 87, a circulation control unit 88, a liquid discharge control unit 89, and a supply unit 90.

The cooling device 82 performs the functions of the preparation tank 21 and the cooling unit 25 of the first embodiment. That is, in the second embodiment, the chemical gas in the cooling device 82 is dissolved in pure water to prepare a chemical solution, and the chemical solution is cooled to a temperature that enables optimal dissolution of the chemical gas, for example, 20° C. or lower.

The dissolution unit 83 supplies the chemical gases contained in first and second gas cylinders 91, 92 to the cooling device 82 when required. The dissolution unit 83 includes a controller 93, a first gas control valve 94, a second gas control valve 95, a waste control valve 96, a first gas mass flow controller 97, a second gas mass flow controller 98, and a water mass flow controller 99. The controller 93 adjusts the control and operation timing of the control valves 94–96, the mass flow controllers 97–99, and each of the units 83–90.

The control valves 94, 95 and the mass flow controllers 97, 98 are arranged in pipes L21, L22 for supplying chemical gas to the cooling device 82 from the gas cylinders 91, 92, respectively. The control valve 96 and the mass flow controller 99 are arranged in a pipe L23 for supplying pure water to the cooling device 82. The gas cylinders 91, 92 contain different types of chemical gases. The controller 93 controls the water control valve 96 and the water mass flow controller 99 to supply a predetermined amount of pure water to the cooling device 82. Afterward, the controller 93 controls the first and second gas control valves 94, 95 and the first and second gas mass flow controllers 97, 98 to form bubbles of a predetermined amount of the chemical gases from the gas cylinders 91, 92 in the cooling device 82. This forms a chemical solution in which two chemical gas components are dissolved within a short period of time. The dissolution of the chemical gases may be performed in two stages if necessary. That is, the first chemical gas may be dissolved in pure water to prepare a chemical solution having a predetermined concentration. Afterward, the second chemical gas may be dissolved in the chemical solution to prepare the desired chemical solution.

Although not shown in the drawing, the cooling device 82 has the same thermometer, ultrasonic wave velocity meter, and specific conductance meter as the first embodiment. The controller 93 calculates the concentration of the chemical solution in the cooling device 82 based on the measured results and controls the supply of chemical gas and pure water based on the calculated result to adjust the concentration of the chemical solution. The controller 93 may also calculate the concentration of the chemical solution in the cooling device 82 based on the remaining amount of chemical gas metered by load cells 91a, 92a provided in the gas cylinders 91, 92, respectively. Further, these calculation procedures may both be used.

The undissolved chemical gases in the cooling device 82 flows through a pipe L24 to the gas discharge control unit 84. The gas discharge control unit 84 includes the controller 93, a return valve 100, a discharge valve 101, and a concentration meter 102. The discharge valve 101 is arranged in the pipe L24. The concentration meter 102 measures the concentration of the chemical gas flowing through the pipe L24. A pipe L27 extends between the concentration meter 102 and the discharge valve 101. A pipe L25 connected to the pipe L27 extends to a location where it is submerged into the chemical solution in the cooling device 82. The return valve 100 is arranged in the pipe L25.

The controller 93 controls the opening and closing of the valves 100, 101. More specifically, the controller 93 closes the return valve 100 and opens the gas discharge valve 101 when the chemical gas concentration is lower than a predetermined value. This discharges chemical gases that include impurities through the pipe L24.

The controller 93 closes the gas discharge valve 101 and opens the return valve 100 when the chemical gas concentration is equal to or higher than the predetermined value. This returns the discharged chemical gas to the cooling device 82 and forms bubbles in the liquid of the cooling device 82 when the concentration of the waste chemical gas in the pipe L24 is equal to or higher than the predetermined value. Accordingly, recyclable chemical gases are not wasted.

The debubbling device 85 is connected to the cooling device 82 by a pipe L26. The debubbling device 85 extracts undissolved chemical gases from the chemical solution that is sent from the cooling device 82. The extracted chemical gas is sent to the gas discharge control unit 84 through a pipe L27. Further, the chemical gas extracted by the debubbling device 85 is returned to the cooling device in accordance with its concentration. The debubbling device 85 includes, for example, a hydrophobic filter for separating the undissolved chemical gases.

The chemical solution from which the undissolved chemical gas has been extracted is sent from the debubbling device 85 to the concentration measuring device 86 through a pipe L28. The concentration measuring device 86 measures the concentration of the chemical solution. The chemical solution is sent from the concentration measuring device 86 to the mixing tank 87 through a pipe L29 and stored in the mixing tank 87.

The circulation control unit 88 includes the controller 93, a control valve 103, and a circulation pump 104. The valve 103 and the pump 104 are arranged in a pipe L30, which connects the bottom of the mixing tank 87 to the cooling device 82. When the chemical solution in the mixing tank 87 does not have the desired concentration, the controller 93 drives the pump 104 and returns the chemical solution from the mixing tank 87 to the cooling device 82 based on the measured result of the concentration measuring device 86. Further, the cooling device 82 adjusts the concentration of the chemical solution by supplying chemical gas or pure water.

The liquid discharge control unit 89 includes the controller 93 and a liquid discharge valve 105. The controller 93 controls the opening and closing of the valve 105 to discharge a predetermined amount of the chemical solution from the mixing tank 87. This removes impurities that cannot be disposed of by the discharged chemical gas and thus produces a very pure chemical solution.

The supply unit 90 includes the controller 93, the control valve 106, and a pump 107. The valve 106 and the pump 107 are arranged in a pipe L31 connecting the mixing tank 87 and the fabrication facility 3 (FIG. 1). The controller 93 controls the valve 106 and the pump 107 and supplies the fabrication facility 3 with a chemical solution having the predetermined concentration.

In addition to the advantages of the first embodiment, the second embodiment has the advantages described below.

(1) The cooling device 82 performs the dissolution of chemical gases and the refinement of the chemical solution when performing cooling. This efficiently dissolves the chemical gases. Accordingly, the cost for purchasing fresh chemical gases is decreased.

It should be apparent to those skilled in the art that the present invention may be embodied in many other specific forms without departing from the spirit or scope of the invention. Particularly, it should be understood that the present invention may be embodied in the following forms.

Figure 6A:
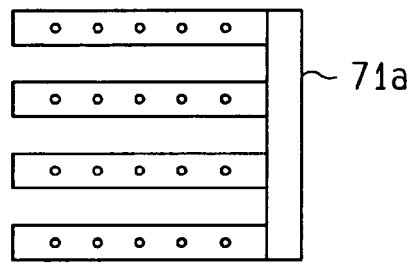
FIGS. 6A, 6B, 6C, 7A, 7B, 8, and 9 are schematic diagrams each showing further bubbler elements.
Figure 6B:
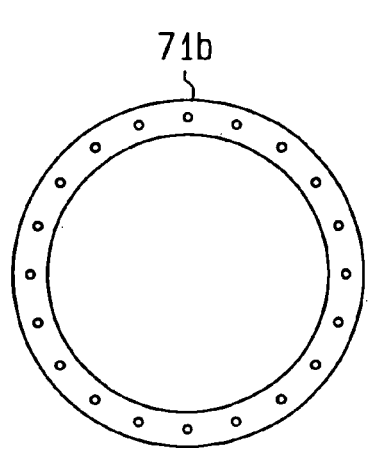
Figure 6C:
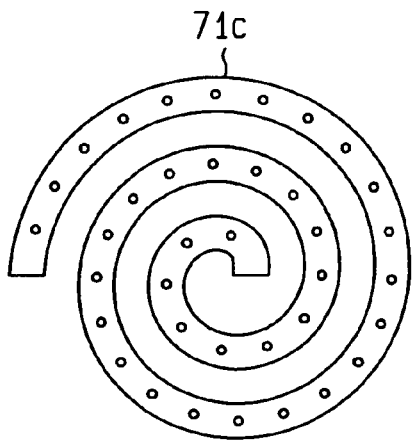

In the first embodiment, the bubbler element 39 has a generally square plate-like shape. However, the bubbler element 39 may have any shape in accordance with the structure (shape, inner dimensions, depth) of the preparation tank 21. For example, a comb-like bubbler element 71a shown in FIG. 6A, a circular bubbler element 71b shown in FIG. 6B, and a spiral bubbler element 71c shown in FIG. 6C may be employed.

Figure 7A:
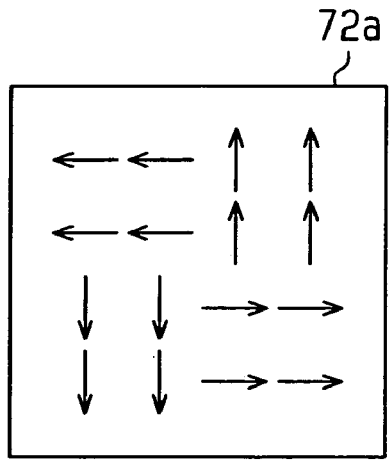
Figure 7B:
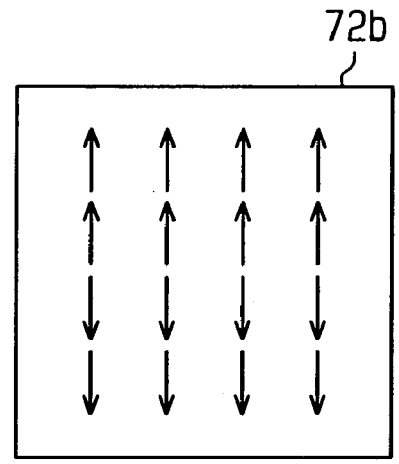

In the first embodiment, the inclination of the nozzles 39a of the bubbler element 39 may be changed as long as the chemical gas bubbles swirl in the chemical solution of the preparation tank 21. For example, as shown in FIG. 7A, a bubbler element 72a having nozzles 39a inclined in the four directions shown by the arrows may be employed. Alternatively, as shown in FIG. 7B, a bubbler element 72b having nozzles inclined in the two directions shown by the arrows may be employed. In these cases, bubbles are ejected in the direction of the arrows by the bubbler elements 72a, 72b.

Figure 8:
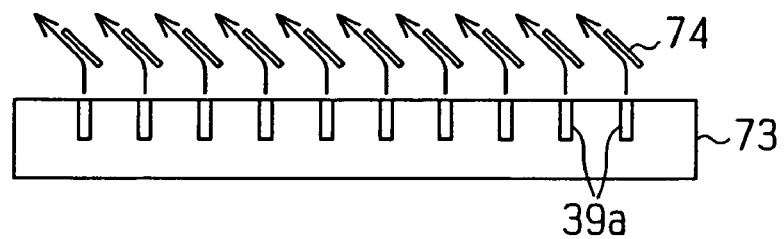

In the first embodiment, instead of inclining the nozzles 39a of the bubbler element 39 by the predetermined angle, a bubbler element 73 having nozzles 39a that eject bubbles vertically may be employed as shown in FIG. 8. In this case, a deflecting plate 74 is located above each of the nozzles 39a. Since the chemical gas bubbles move along the deflecting plates 74, the deflecting plates 74 function in the same manner as the inclined nozzles 39a. Further, the inclination of the deflecting plates 74 may be changed to adapt to various shapes of the preparation tank 21. Additionally, the bubbler element 73 may be inclined at a predetermined angle.

Figure 9:
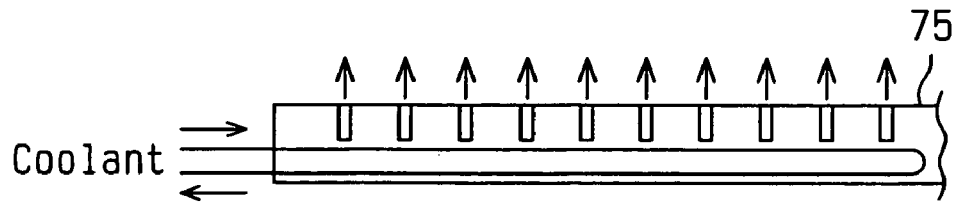

In the above embodiments, a bubbler element 75 shown in FIG. 9 may be used. A coolant is circulated through the bubbler element 75. Thus, the bubbler element 75 also has the function of the cooling element 47 and serves as a cooling mechanism (heat exchanger). When fine bubbles of ammonia gas are ejected from the bubbler element 75, ammonia gas starts to dissolve into the pure water near the bubbler element 75. The generated heat of hydration increases the temperature of the liquid near the bubbler element 75. Accordingly, the vicinity of the location where heat is generated is cooled by employing the cooling mechanism function in the bubbler element 75. In addition, the bubbler element 75 cools ammonia gas. As a result, the bubbler element 75, which cools liquids, improves the dissolving efficiency of the ammonia gas and decreases the amount of ammonia gas that is discharged without being dissolved.

Figure 10:
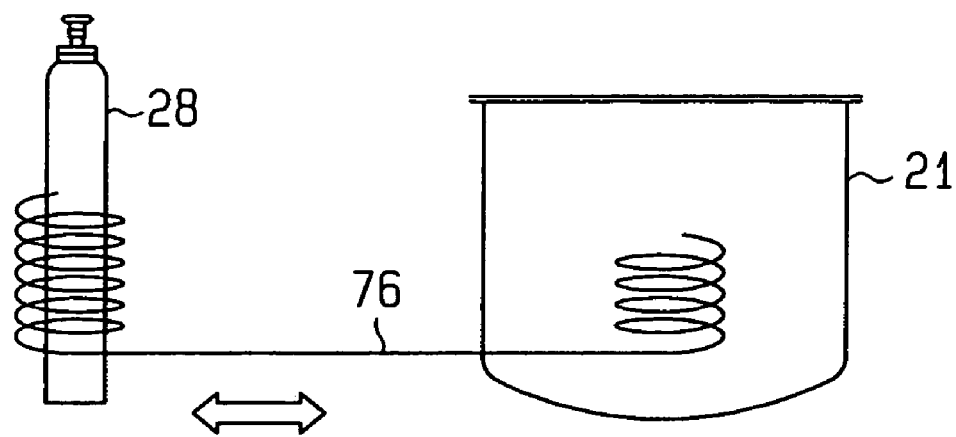
FIG. 10 is a schematic view illustrating heat transfer that occurs between a gas cylinder and a fabrication tank.

As shown in FIG. 10, a heat exchange pipe 76 connecting the gas cylinder 28 and the preparation tank 21 may be used in lieu of the cooling element 47. When supplying ammonia gas from the gas cylinder 28, the gas cylinder 28 is cooled by evaporative cooling. Further, heat is generated when the ammonia gas is dissolved in the pure water, and when the ammonia gas is dissolved in 50 wt % of hydrofluoric acid. Thus, the preparation tank 21 is cooled by the heat exchange pipe 76. This arrangement efficiently uses heat energy.

A known temperature adjusting device, such as a thermostat, may be used in lieu of the cooling element 47.

Figure 11:
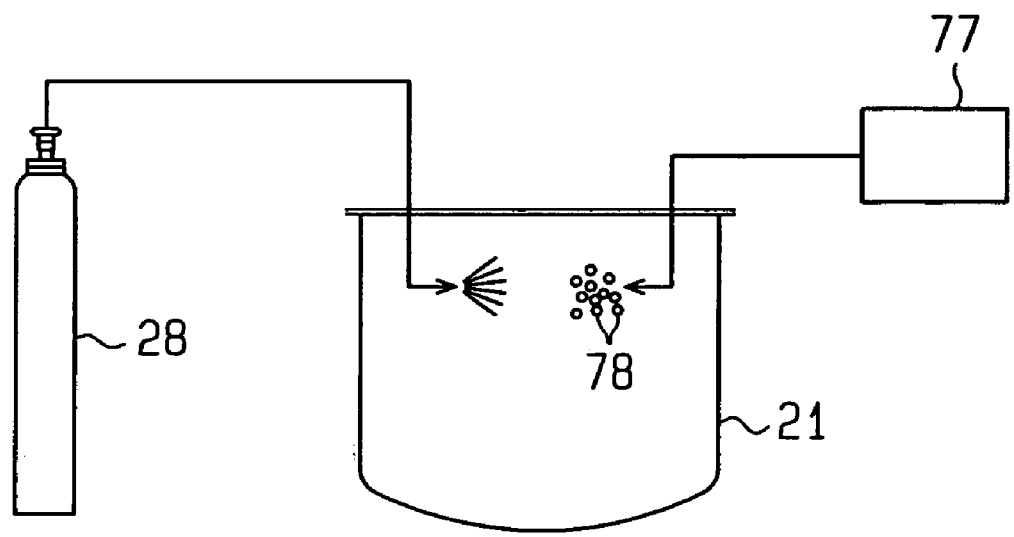
FIG. 11 is a schematic view illustrating a further dissolving method.

In the first embodiment, the chemical solution may be prepared without dissolving the chemical gas in pure water or hydrofluoric acid. For example, as shown in FIG. 11, an ice particle generator 78 may be employed to provide ice particles to the preparation tank 21, into which the ammonia gas of the gas cylinder 28 is drawn. The heat of hydration generated when the ammonia gas changes to ammonia water is cooled by the heat of dissolution of the ice particles 78. Further, ammonia gas is dissolved in the water film formed on the surface of the ice particles 78 by the heat of hydration. Accordingly, cooling and dissolving of the ammonia gas is performed simultaneously. Further, the cooling and dissolution enables efficient preparation of the chemical solution.

The above embodiments employ the mass flow controllers 36, 97, 98 to adjust the supplied amount of chemical gas. However, at least one of a depressurizing valve, a manual valve, an automatic valve, and a mass flow controller may be employed to adjust the supplied amount of chemical gas.

In each of the above embodiments, a gravimeter, acid-base titration, or a method and device for measuring the near infrared absorption waveform may be employed to measure the amount of dissolved chemical gas (chemical solution concentration).

In the above embodiments, at least one of ammonia gas, hydrogen fluoride gas, hydrogen sulfide gas, and hydrogen chloride gas may be used as the general industrial chemical gas.

Ammonia water and a mixture of ammonia water and hydrofluoric acid are prepared in the above embodiments. However, ammonia may be used as the chemical gas, and the prepared chemical solution may be at least one of ammonia water, a mixture of ammonia water and hydrogen peroxide, and a mixture of ammonium fluoride and hydrofluoric acid.

In the above embodiments, instead of purifying the chemical gas supplied to the fabrication facility 3 in the gas purification unit 12, the industrial chemical gas supplied to the chemical solution refinement device 11 may be refined. That is, the gas purification unit 12 may be arranged in the pipes L1, L21, L22 through which industrial chemical gases are supplied to the solution refinement devices 11, 81. In such case, the refined gas is dissolved in a solvent, such as pure water, to prepare a chemical solution having higher purity.

In the first embodiment, instead of using the gas purification unit 12, which sprays pure water, the industrial chemical gas may be purified by using a static mixer. In this case, the industrial chemical gas is mixed with pure water in the static mixer. This increases the area of contact between the industrial chemical gas and the pure water and efficiently refines the industrial chemical gas.

In the above embodiments, the pumps 51, 107 need not be employed to supply the prepared chemical solution to the fabrication facility 3. For example, an inert gas may be supplied to the tanks 21, 87 to send the chemical solution to the fabrication facility with the pressure of the inert gas.

In the above embodiments, instead of using every one of the thermometer 40, the ultrasonic wave velocity meter 41, and the specific conductance meter 42, at least one of the ultrasonic wave velocity meter 41, the specific conductance meter 42, a viscosity meter, and a specific gravity meter may be used with the thermometer 40 to measure the concentration of the chemical solution.

The present examples and embodiments are to be considered as illustrative and not restrictive, and the invention is not to be limited to the details given herein, but may be modified within the scope and equivalence of the appended claims.

The invention claimed is:

1. A chemical solution preparation apparatus comprising a chemical solution refinement device, which dissolves a chemical gas into a liquid and prepares a refined chemical solution, wherein the liquid is one of pure water or a mixture having a predetermined composition, the chemical solution refinement device including:

a preparation tank for storing the liquid;

a first pipe for supplying the chemical gas into the preparation tank;

a first valve arranged in the first pipe for opening and closing the first pipe;

a second pipe for discharging the chemical gas that was not dissolved in the liquid during the gas dissolving from the preparation tank;

a second valve arranged in the second pipe for opening and closing the second pipe;

a third pipe connected to the preparation tank for draining a predetermined amount of the chemical solution out of the chemical solution preparation apparatus during the gas dissolving to increase the purity of the chemical solution;

a third valve arranged in the third pipe for opening and closing the third pipe; and a controller for operating the first, second and third valves, wherein, when the controller is programmed to operate the first valve so as to supply the chemical gas to the preparation tank, the controller is programmed to operate the second valve and the third valve so as to simultaneously discharge an adjusted amount of the undissolved chemical gas and a predetermined amount of the chemical solution that is under preparation from the preparation tank.

2. The preparation apparatus according to claim 1, wherein the chemical solution refinement device further includes a bubbler element for forming bubbles of the chemical gas in the preparation tank to dissolve the chemical gas in the liquid.

3. The preparation apparatus according to claim 1, wherein the chemical solution refinement device further includes a flow controller arranged in the first pipe.

4. The preparation apparatus according to claim 2, further comprising a cooling unit for cooling the liquid in the preparation tank.

5. A chemical solution preparation apparatus comprising a chemical solution refinement device, which dissolves a chemical gas into a liquid and prepares a refined chemical solution, wherein the liquid is one of pure water or a mixture having a predetermined composition, the chemical solution refinement device including:

a preparation tank for storing the liquid;

a gas supply line for supplying the chemical gas to the preparation tank;

a liquid supply line for supplying the liquid to the preparation tank;

a first valve arranged in the gas supply line for opening and closing the gas supply line;

a bubbler element connected to the gas supply line for forming bubbles of the chemical gas in the preparation tank to dissolve the chemical gas in the liquid;

a second pipe for discharging an adjusted amount of the chemical gas that was not dissolved in the liquid from the preparation tank;

a second valve arranged in the second pipe for opening and closing the second pipe;

a third pipe for discharging a predetermined amount of the chemical solution from the preparation tank;

a third valve arranged in the third pipe for opening and closing the third pipe;

a controller for simultaneously operating the first, second and third valves; and a cooling unit for cooling the liquid in the preparation tank, wherein the cooling unit includes a pump for circulating the chemical solution between the preparation tank and a second pipe and a cooling element connected to the second pipe.

6. A chemical solution preparation apparatus comprising a chemical solution refinement device, which dissolves a chemical gas into a liquid and prepares a refined chemical solution, wherein the liquid is one of pure water or a mixture having a predetermined composition, the chemical solution refinement device including:

a preparation tank for storing the liquid;

a gas supply line for supplying the chemical gas to the preparation tank;

a liquid supply line for supplying the liquid to the preparation tank;

a first valve arranged in the gas supply line for opening and closing the gas supply line;

a bubbler element connected to the gas supply line for forming bubbles of the chemical gas in the preparation tank to dissolve the chemical gas in the liquid;

a gas discharge line for discharging an adjusted amount of the chemical gas that was not dissolved in the liquid from the preparation tank;

a second valve arranged in the gas discharge line for opening and closing the gas discharge line;

a chemical solution discharge line for discharging a predetermined amount of the chemical solution from the preparation tank;

a third valve arranged in the chemical solution discharge line for opening and closing the chemical solution discharge line;

a cooling unit for cooling the liquid in the preparation tank, wherein the cooling unit includes a cooling element connected to the preparation tank and a pump for circulating the chemical solution between the preparation tank and the cooling element.

7. A chemical solution preparation apparatus comprising a chemical solution refinement device, which dissolves a chemical gas into a liquid and prepares a refined chemical solution, wherein the liquid is one of pure water or a mixture having a predetermined composition, the chemical solution refinement device including:

a preparation tank for storing the liquid;

a gas supply line for supplying the chemical gas to the preparation tank;

a liquid supply line for supplying the liquid to the preparation tank;

a first valve arranged in the gas supply line for opening and closing the gas supply line;

for forming bubbles of the chemical gas in the preparation tank to dissolve the chemical gas in the liquid;

a gas discharge line for discharging an adjusted amount of the chemical gas that was not dissolved in the liquid from the preparation tank;

a second valve arranged in the gas discharge line for opening and closing the gas discharge line;

a chemical solution discharge line for discharging a predetermined amount of the chemical solution from the preparation tank;

a third valve arranged in the chemical solution discharge line for opening and closing the chemical solution discharge line;

a controller for simultaneously operating the first, second and third valves;

a cooling unit for cooling the liquid in the preparation tank; and a gas cylinder containing liquefied chemical gas, wherein the cooling unit includes a heat exchanger for exchanging heat between the gas cylinder and the preparation tank.

8. The preparation apparatus according to claim 2, wherein the bubbler element has a nozzle for forming fine bubbles of the chemical gas.

9. The preparation apparatus according to claim 8, wherein the nozzle is inclined by a predetermined angle relative to a vertical direction.

10. The preparation apparatus according to claim 8, wherein the nozzle extends vertically, and the bubbler element further includes a deflection plate for guiding the bubbles in a predetermined direction.

11. The preparation apparatus according to claim 1, further comprising:
- a concentration measuring device for measuring the concentration of the chemical solution; and
- a concentration adjusting device for adjusting the concentration of the chemical solution in accordance with the measured result of the concentration measuring device.

12. A chemical solution preparation apparatus comprising a chemical solution refinement device, which dissolves a chemical gas into a liquid and prepares a refined chemical solution, wherein the liquid is one of pure water or a mixture having a predetermined composition, the chemical solution refinement device including:
- a preparation tank for storing the liquid;
- a gas supply line for supplying the chemical gas to the preparation tank;
- a liquid supply line for supplying the liquid to the preparation tank;
- a first valve arranged in the gas supply line for opening and closing the gas supply line;
- a gas discharge line for discharging an adjusted amount of the chemical gas that was not dissolved in the liquid from the preparation tank;
- a second valve arranged in the gas discharge line for opening and closing the gas discharge line;
- a chemical solution discharge line for discharging a predetermined amount of the chemical solution from the preparation tank;
- a third valve arranged in the chemical solution discharge line for opening and closing the chemical solution discharge line;
- a concentration measuring device for measuring the concentration of the chemical solution, wherein the concentration measuring device includes at least one of a viscosity meter, a specific gravity meter, an ultrasonic wave velocity meter, and a specific conductance meter; and
- a concentration adjusting device for adjusting the concentration of the chemical solution in accordance with the measured result of the concentration measuring device, wherein the concentration adjusting device includes a controller for calculating the concentration of the chemical solution from the measured result of the concentration measuring device and controlling the amount of the chemical gas supplied to the preparation tank from the gas supply line in accordance with the calculated concentration, and wherein when the controller operates the first valve to supply the chemical gas to the preparation tank, the controller operates the second valve and the third valve to discharge an adjusted amount of the undissolved chemical gas and a predetermined amount of the chemical solution that is under preparation from the preparation tank.

13. The preparation apparatus according to claim 12, wherein the concentration measuring device measures the heat of reaction during dissolution of the chemical gas with a thermometer and calculates the amount of dissolved chemical gas from the measured result to obtain the concentration of the chemical solution.

14. The preparation apparatus according to claim 12, wherein the gas supply line includes a container in which the chemical gas in contained, and wherein the concentration measuring device calculates the amount of the used chemical gas by measuring the change in the weight of the container and calculates the concentration of the chemical solution from the amount of the used chemical gas.

15. The preparation apparatus according to claim 1, further comprising an ice particle generator for generating ice particles, and wherein the dissolution unit causes contact between the ice particles and the chemical gas to dissolve the chemical gas in the liquid.

16. The preparation apparatus according to claim 1, further comprising a gas purification unit for purifying the chemical gas with pure water.

17. A chemical solution preparation apparatus comprising a chemical solution refinement device, which dissolves a chemical gas into a liquid and prepares a refined chemical solution, wherein the liquid is one of pure water or a mixture having a predetermined composition, the chemical solution refinement device including:
- a gas supply line for supplying the chemical gas;
- a first valve arranged in the gas supply line for opening and closing the gas supply line;
- a cooling unit connected to the gas supply line for storing and cooling the liquid during the preparation of the chemical solution;
- a tank for storing the chemical solution received from the cooling unit;
- a gas discharge line for discharging an adjusted amount of the chemical gas that was not dissolved in the liquid during the gas dissolving from the cooling unit;
- a second valve arranged in the gas discharge line for opening and closing the gas discharge line;
- a chemical solution discharge line connected to the tank for draining a predetermined amount of the chemical solution out of the chemical solution preparation apparatus during the gas dissolving; and
- a third valve arranged in the chemical solution discharge line for opening and closing the chemical solution discharge line; and
- a controller for operating the first, second and third valves, wherein, when the controller operates the first valve so as to supply the chemical gas to the preparation tank, the controller operates the second valve and the third valve so as to simultaneously discharge an adjusted amount of the undissolved chemical gas from the cooling unit, and to discharge a predetermined amount of the chemical solution from the tank.

18. The preparation apparatus according to claim 17, wherein the chemical solution refinement device is connected to a facility for fabricating electronic devices to dissolve used chemical gas disposed of by the fabrication facility in the liquid.

19. The preparation apparatus according to claim 18, further comprising a gas purification unit for purifying the chemical gas with pure water and providing the purified chemical gas to the fabrication facility.

20. The preparation apparatus according to claim 17, further comprising a flow controller arranged in the gas supply line.

21. The preparation apparatus according to claim 17, wherein the chemical gas is contained in a predetermined container, and wherein the chemical solution refinement device includes means for measuring the weight of the chemical gas in the container so as to calculate the amount of the chemical gas supplied to the preparation tank.

22. The preparation apparatus according to claim 17, wherein the chemical solution refinement device includes a hydrophobic filter for separating undissolved chemical gas from the chemical solution discharged from the cooling unit, the separated chemical gas being supplied to the cooling unit.

23. The preparation apparatus according to claim 17, further comprising a concentration measuring device for extracting some of the chemical solution during the preparation and measuring the concentration of the chemical solution, the concentration of the chemical solution being adjusted to a predetermined concentration by supplying the chemical gas to the chemical solution during preparation.

24. The preparation apparatus according to claim 17, further comprising a raw material supplying device for supplying a raw material that differs from the chemical gas to the prepared chemical solution.

25. The preparation apparatus according to claim 1, wherein when preparing the chemical solution, the controller is programmed to open the first, second, and third valves.

26. The preparation apparatus according to claim 11, wherein the controller is programmed to keep the second and third valves opened to continuously discharge the undissolved chemical gas and the chemical solution from the preparation tank until the concentration of the chemical solution contained in the preparation tank reaches a target value.

27. The preparation apparatus according to claim 11, wherein when the impurities are eliminated from the chemical solution and the concentration of the chemical solution contained in the preparation tank reaches a target value, the controller is programmed to simultaneously close the first valve, the second valve and the third valve to stop supplying the chemical gas and to stop discharging the undissolved chemical gas and the chemical solution from the preparation tank.

* * * * *